United States Patent
Kohn et al.

(10) Patent No.: US 10,671,401 B1
(45) Date of Patent: *Jun. 2, 2020

(54) MEMORY HIERARCHY TO TRANSFER VECTOR DATA FOR OPERATORS OF A DIRECTED ACYCLIC GRAPH

(71) Applicant: Ambarella International LP, Santa Clara, CA (US)

(72) Inventors: Leslie D. Kohn, Saratoga, CA (US); Robert C. Kunz, Sunnyvale, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,571

(22) Filed: Aug. 16, 2019

Related U.S. Application Data

(63) Continuation of application No. 15/593,463, filed on May 12, 2017, now Pat. No. 10,437,600.

(60) Provisional application No. 62/500,030, filed on May 2, 2017.

(51) Int. Cl.
*G06F 9/38* (2018.01)
*G06F 3/06* (2006.01)
*G06F 13/28* (2006.01)
*G06F 9/30* (2018.01)

(52) U.S. Cl.
CPC ............ *G06F 9/3851* (2013.01); *G06F 3/061* (2013.01); *G06F 3/0625* (2013.01); *G06F 3/0631* (2013.01); *G06F 3/0647* (2013.01); *G06F 3/0656* (2013.01); *G06F 3/0673* (2013.01); *G06F 9/30036* (2013.01); *G06F 9/3877* (2013.01); *G06F 9/3887* (2013.01); *G06F 13/28* (2013.01)

(58) Field of Classification Search
CPC .......................... G06F 9/3877; G06F 9/3851
See application file for complete search history.

(56) References Cited

U.S. PATENT DOCUMENTS

| | | | |
|---|---|---|---|
| 6,173,438 B1 | 1/2001 | Kodosky | 717/105 |
| 6,621,495 B1 | 9/2003 | Cook | 345/418 |
| 2004/0107264 A1 | 6/2004 | Nishida | 709/213 |
| 2006/0251092 A1 | 11/2006 | Mattern | 370/412 |
| 2006/0282646 A1 | 12/2006 | Dockser | 712/4 |
| 2007/0294682 A1 | 12/2007 | Demetriou | 717/153 |
| 2016/0210720 A1 | 7/2016 | Taylor | |

OTHER PUBLICATIONS

Andrew S. Tanenbaum, "Structured Computer Organization", 1984, Prentice-Hall, Second edition, 5 pages (Year: 1984).

(Continued)

*Primary Examiner* — Jyoti Mehta
(74) *Attorney, Agent, or Firm* — Christopher P. Maiorana, PC

(57) ABSTRACT

An apparatus includes a scheduler circuit and a plurality of hardware engines. The scheduler circuit may be configured to (i) store a directed acyclic graph, (ii) parse the directed acyclic graph into a plurality of operators and (iii) schedule the operators in one or more data paths based on a readiness of the operators to be processed. The hardware engines may be (i) configured as a plurality of the data paths and (ii) configured to generate one or more output vectors by processing zero or more input vectors using the operators.

20 Claims, 5 Drawing Sheets

(56) References Cited

OTHER PUBLICATIONS

Kramer et al., "The Combining DAG: A technique for parallel data flow analysis", Aug. 1994, IEEE, 1045-9219/94, 9 pages, (Year: 1994).

Li et al., "Quantifying Instruction Criticality for Shared Memory Multiprocessors", Feb. 19, 2009, 29 pages, [retrieved from the internet on Nov. 6, 2018], retrieved from URL <happyli.org/tongli/papers/SPAA03-talk.pdf>, (Year: 2009).

MEMORY HIERARCHY TO TRANSFER VECTOR DATA FOR OPERATORS OF A DIRECTED ACYCLIC GRAPH

This application relates to U.S. Ser. No. 15/593,463, filed May 12, 2017; which relates to U.S. Provisional Application No. 62/500,030, filed May 2, 2017, each of which are hereby incorporated by reference in their entirety.

FIELD OF THE INVENTION

The invention relates to vector processing generally and, more particularly, to a method and/or apparatus for implementing a scheduler and memory hierarchy in a coprocessor.

BACKGROUND

Conventional general purpose programmable processors executing sequential streams of instructions address different criteria across diverse problem domains. Aggressive pipelining and out-of-order execution have been applied to extract parallelism from the instruction streams, but the gains are limited by inherent data and control dependencies. To further improve performance, single instruction, multiple data (SIMD) instructions and multiple cores executing parallel instruction streams have been used. However, the resulting implementations tend to be inefficient and do not exploit detailed understandings of the problem domain to optimize data paths and dynamic random access memory bandwidth. Furthermore, the implementations are difficult for compilers to extract the inherent parallelism of processes expressed in conventional programming languages. The demanding specifications of real time computer vision processing drives toward a more power and cost efficient implementation using specialized engines for computer vision tasks. However, computer vision tasks are rapidly evolving and the specialized engines are not commonly flexible to support new or enhanced tasks.

It would be desirable to implement a scheduler and memory hierarchy in a coprocessor.

SUMMARY

The invention concerns an apparatus including a scheduler circuit and a plurality of hardware engines. The scheduler circuit may be configured to (i) store a directed acyclic graph, (ii) parse the directed acyclic graph into a plurality of operators and (iii) schedule the operators in one or more data paths based on a readiness of the operators to be processed. The hardware engines may be (i) configured as a plurality of the data paths and (ii) configured to generate one or more output vectors by processing zero or more input vectors using the operators.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
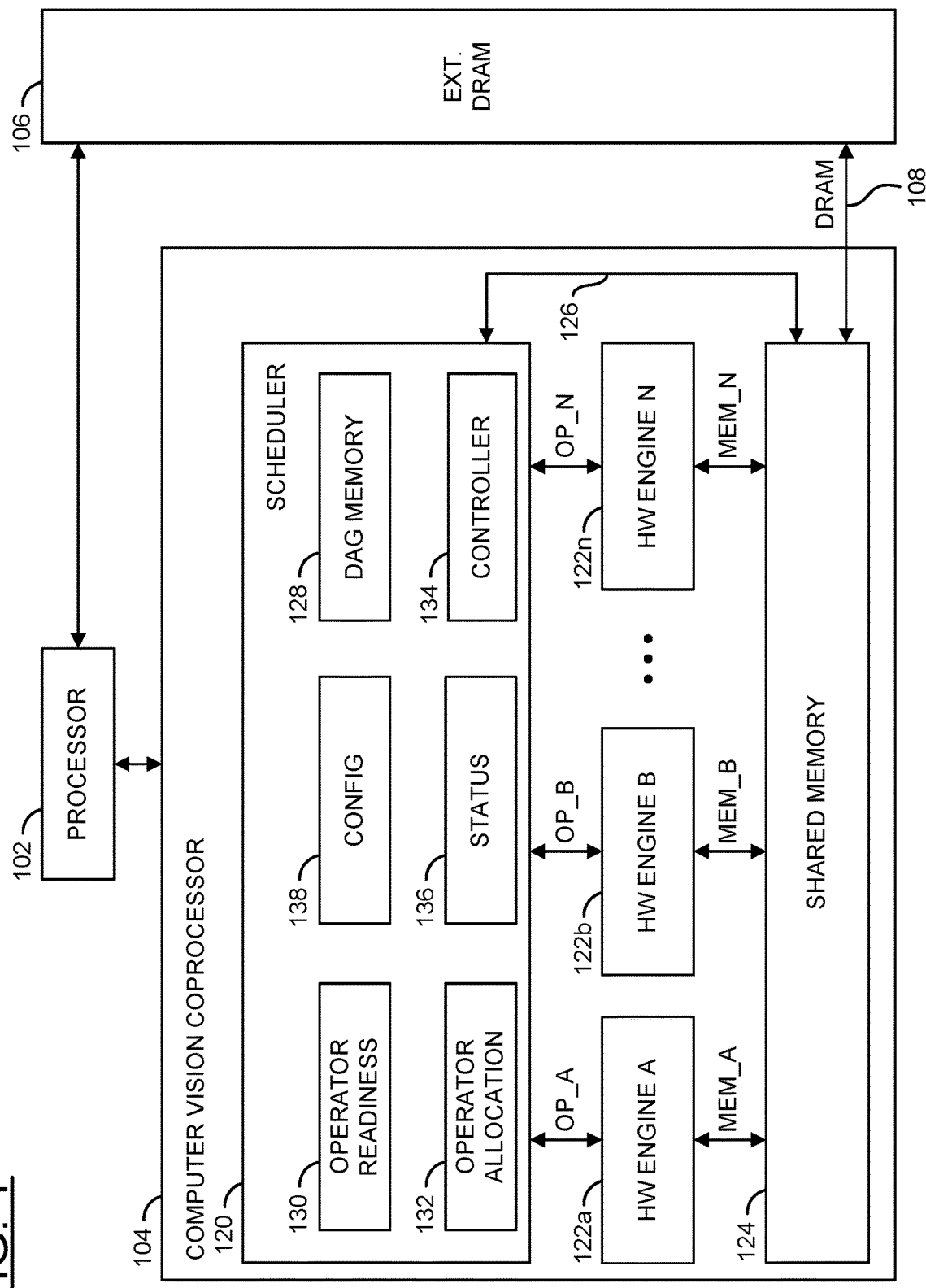
FIG. 1 is a diagram of a system.

Embodiments of the present invention include providing a scheduler and memory hierarchy in a coprocessor that may (i) provide a flexible hardware coprocessor engine, (ii) execute data flow graphs for computer vision tasks, (iii) operate on variable size vectors, (iv) operate on multidimensional vectors, (v) implement high level operations solely in hardware, (vi) optimize internal memory bandwidth, (vii) optimize external memory bandwidth and/or (viii) be implemented as one or more integrated circuits.

Embodiments of the architecture generally implement a flexible hardware coprocessor engine for directly executing data flow graphs for computer vision tasks. Each data flow graph may be specified as a set of operators connected through a directed acyclic graph (DAG) structure that specifies explicit dependencies. The operators may operate on variable-size multidimensional vectors. In addition to simple operators like add and multiply, higher level operations such as convolution and matrix multiply may be provided in the coprocessor. The architecture generally allows computer vision tasks to more efficiently use available hardware units, and to optimize an external memory bandwidth and an internal memory bandwidth.

The computer vision tasks may contain extensive data parallelism in the form of vector operations on images and/or multidimensional vectors. Each directed acyclic graph may specify primary inputs (loaded from memory), primary outputs (stored to memory) and a set of operations. The operations may be related to each other (e.g., by links) with some operations running in parallel. Each input of an operation, if any, may be connected to a primary input or an output of an upstream operation. Each output of each operation may be connected to a primary output and/or downstream operation inputs. The directed acyclic graphs generally allow full parallelism of the tasks to be expressed by eliminating control flow dependencies and making all data dependencies explicit.

Processing a directed acyclic graph in a direct manner generally involves loading all input vectors from and storing all output vectors of each operator to an external memory circuit. The external memory circuit and a memory bus alone may bottleneck an effective rate of computation and available parallelism even with a general-purpose caching hierarchy. Alternatively, the full input vectors and the output vectors may be stored in on-chip memory, but the amount of on-chip memory may be large.

In various embodiments, the coprocessor may execute multiple operators in parallel while only buffering a minimal amount of vector data in the on-chip memory suitable for scheduled operators to make progress. The coprocessor generally includes dedicated on-chip resources (e.g., data paths) for processing the operators. Different types of data paths may be optimized for specific operators or groups of operators with similar control structures and memory access patterns. While a single instance of a data path may run only a single operator at once in some instances, generally a one-to-one correspondence does not exist between an operator and a data path. Various embodiments of the coprocessor may include many data paths that may run the same operator type, and/or a single data path that may run many types of operators. Separate implementations of the coprocessor may contain different operators and types of supported data paths.

A small (or minimal) amount of data may be buffered on-chip by the coprocessor for operators to continue making progress. The minimum amount of data may be large depending on the type of operation. For example, a windowed operation typically buffers up to several rows before processing a moving window over available input data to generate the output data. In some cases, the minimum amount of data may be the entire vector (called a full-vector buffer). The vectors in such cases are generally constrained to a size that fits the on-chip memory.

The coprocessor generally includes a scheduling mechanism to allow the hardware to automatically process operators that are ready to run using the on-chip resources that may be available. The scheduling may minimize the amount of buffering performed by allowing an operator to partially execute on a data path. If enough input data is available for the operator to progress, the scheduling mechanism may place the operator on a data path. The scheduling mechanism may enable out-of-order execution of operators and may virtualize a relationship between the operator and the data paths.

Referring to FIG. 1, a diagram of a system 100 is shown illustrating a context in which one or more vector processing operations may be implemented in accordance with an example embodiment of the invention. The system (or apparatus) 100 may be implemented as part of a computer vision system. In various embodiments, the system 100 may be implemented as part of a camera, a computer, a server (e.g., a cloud server), a smart phone (e.g., a cellular telephone), a personal digital assistant, or the like.

In an example embodiment, the system 100 generally comprises a block (or circuit) 102, a block (or circuit) 104, a block (or circuit) 106 and a memory bus 108. The circuit 104 generally comprises a block (or circuit) 120, one or more blocks (or circuits) 122a-122n, a block (or circuit) 124 and a path 126. The circuit 120 may include a block (or circuit) 128, a block (or circuit) 130, a block (or circuit) 132, a block (or circuit) 134, a block (or circuit) 136 and a block (or circuit) 138.

Multiple signals (e.g., OP_A to OP_N) may be exchanged between the circuit 120 and the respective circuits 122a-122n. Each signal OP_A to OP_N may convey processing operation information and/or yield operation information. Multiple signals (e.g., MEM_A to MEM_N) may be exchanged between the respective circuits 122a-122n and the circuit 124. The signals MEM_A to MEM_N may carry data. A signal (e.g., DRAM) may be exchanged between the circuit 106 and the circuit 124. The signal DRAM may transfer data between the circuits 106 and 124.

The circuit 102 may implement a processor circuit. In some embodiments, the processor circuit 102 may be a general purpose processor circuit. The processor circuit 102 may be operational to interact with the circuit 104 and the circuit 106 to perform various vector processing tasks.

The circuit 104 may implement a coprocessor circuit. The coprocessor circuit 104 is generally operational to perform specific vector processing tasks as arranged by the processor circuit 102. The coprocessor circuit 104 may be separate from the processor circuit 102 and generally helps the primary processor circuit 102 to accomplish the vector processing tasks. In various embodiments, the coprocessor circuit 104 may operate as a directed acyclic graph vector processor implemented solely in hardware. The coprocessor circuit 104 may directly perform a data flow directed acyclic graph generated by software that specifies vector processing (e.g., computer vision processing) tasks. The directed acyclic graph generally contains descriptors that specify input/output buffers in the circuit 106 and/or the circuit 124, computation nodes that perform vector processing computations, called operators (or tasks), and the dependencies between data buffers and the operators (e.g., links in the graphs).

The circuit 106 may implement a dynamic random access memory (DRAM) circuit. The DRAM circuit 106 is generally operational to store multidimensional arrays of input data elements and various forms of output data elements. The DRAM circuit 106 may exchange the input data elements and the output data elements with the processor circuit 102 and the coprocessor circuit 104.

The circuit 120 may implement a scheduler circuit. The scheduler circuit 120 is generally operational to schedule tasks among the circuits 122a-122n to perform a variety of computer vision tasks as defined by the processor circuit 102. Individual tasks may be allocated by the scheduler circuit 120 to the circuits 122a-122n. The scheduler circuit 120 may time multiplex the tasks to the circuits 122a-122n based on the availability of the circuits 122a-122n to perform the work. Additional details of the scheduler circuit 120 may be available in co-pending U.S. application Ser. No. 15/581,341, filed Apr. 28, 2017, and Ser. No. 15/591,352, filed May 10, 2017, each of which are hereby incorporated by reference in their entirety.

Each circuit 122a-122n may implement a processing resource (or hardware resource or hardware engine). The hardware engines 122a-122n are generally operational to perform specific processing tasks. In some configurations, the hardware engines 122a-122n may operate in parallel and independent of each other. In other configurations, the hardware engines 122a-122n may operate collectively among each other to perform allocated tasks. The hardware engines 122a-122n may be homogenous processing resources (all circuits 122a-122n may have the same capabilities) or heterogeneous processing resources (two or more circuits 122a-122n may have different capabilities). The operators performed by the hardware engines 122a-122n may include, but are not limited to, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum operator, a non-maximum suppression operator, a gather operator, a scatter operator, a statistics operator, a classifier operator, an integral image operator, an upsample operator and a sums of horizontally overlapping sliding windows operator. In various embodiments, the hardware engines 122a-122n may be implemented solely as hardware circuits. Additional details of hardware engine implementations may be found in co-pending U.S. application Ser. No. 15/291,273 filed Oct. 12, 2016, Ser. No. 15/372,995 filed Dec. 8, 2016, Ser. No. 15/403,540 filed Jan. 11, 2017, Ser. No. 15/405,456 filed Jan. 13, 2017, Ser. No. 15/444,641 filed Feb. 18, 2017, and Ser. No. 15/581,220, filed Apr. 28, 2017, each of which are hereby incorporated by reference in their entirety.

The circuit 124 may implement a shared memory circuit. The shared memory 124 is generally operational to store all of or portions of the multidimensional arrays (or vectors) of input data elements and output data elements generated by the hardware engines 122a-122n. The input data elements may be received from the DRAM circuit 106 via the memory bus 108. The output data elements may be sent to the DRAM circuit 106 via the memory bus 108.

The path 126 may implement a transfer path internal to the coprocessor circuit 104. The transfer path 126 is generally operational to move data from the scheduler circuit 120 to the shared memory 124. The transfer path 126 may also be operational to move data from the shared memory 124 to the scheduler circuit 120.

The circuit 128 may implement a local directed acyclic graph (DAG) memory. The DAG memory 128 may be operational to store one or more binary representations of one or more directed acyclic graphs used by the scheduler circuit 120. The directed acyclic graph representations may be compiled external to the system 100 and loaded into the DAG memory 128 through the shared memory 124.

The circuit 130 may implement an operator readiness circuit. The operator readiness circuit 130 is generally operational to determine when operators are ready for processing in the hardware engines 122a-122n. An operator is generally ready for processing when all operands (e.g., input vectors) corresponding to that operator are ready.

The circuit 132 may implement an operator allocation circuit. The operator allocation circuit 132 may be operational to allocate the operators and corresponding operands among one or more hardware engines 122a-122n for processing. The allocation may be based on availability of the hardware engines 122a-122n, the readiness of the operators and the operands, and a priority of the operands.

The circuit 134 may implement a controller circuit. The controller circuit 134 may receive a directed acyclic graph either directly from the processor circuit 102, indirectly from the DRAM circuit 106 or from the shared memory 124. The directed acyclic graph may be stored in the DAG memory 128. Upon receipt of a run command from the processor circuit 102, the controller circuit 134 may parse the directed acyclic graph into one or more data flows. Each data flow may include one or more operators. Once the directed acyclic graph is parsed, the controller circuit 134 may allocate the data flows/operators to the hardware engines 122a-122n and send the relevant operator configuration information to start the operators.

The circuit 136 may implement a status circuit (or registers). The status registers 136 is generally operational to store status of the hardware engines 122a-122n, the processing of the operators, and the status of the operands. The status data may be exchanged with the controller circuit 134.

The circuit 138 may implement a configuration circuit (or registers). The configuration registers 138 are generally operational to store configuration data of the hardware engines 122a-122n. The configuration data may be exchanged with the controller circuit 134.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands. In some embodiments, multiple (e.g., two) separate tables may be employed, a table of all operators and another table of all descriptors linked together with explicit registers.

The directed acyclic graph descriptions may be different than traditional processor programs in several fundamental ways. Dependencies between operators may occur locally and are stated explicitly in the directed acyclic graph instead of implied by the sequential ordering of instructions in the program. In conventional instruction streams, instructions share states through global state registers or on-chip memory. While the directed acyclic graph supports conditional execution, the vector processing (e.g., coprocessor 104) may execute natively without benefit of a program counter or control flow present in instruction streams. Looping generally exists as higher dimensions in a vector and without the aid of looping variables. Operator inputs and outputs may be vector operands of up to several (e.g., 4) or more dimensions. The size of each dimension may be variable, rather than a few fixed-size scalar or single instruction, multiple data (SIMD) data types. Complex vector operations generally allow tasks to be efficiently expressed. Furthermore, the directed acyclic graphs may have no concept of a program counter or instruction streams. A master scheduler (e.g., the scheduler circuit 120) may time-multiplex operators on available hardware resources (e.g., the hardware engines 122a-122n) based on data dependencies expressed in the graph. In traditional processors, instructions execute atomically. In the vector processor, complex operators with some input data available, may partially execute based on available hardware resources. Partial execution generally allows the hardware resources to be scheduled more efficiently and allows on-chip memory (e.g., the shared memory 124) to be used to pass results between operators instead of storing and loading from an external memory (e.g., the DRAM circuit 106).

Operators may use optimized data paths to directly perform complex vector operations efficiently and with lower memory bandwidth. The data paths may replace nested for-loops that repeat a code sequence on a conventional processor, and associated overhead like loop unrolling, software pipelining, branch prediction and superscalar execution. The operators may match common looping structures present in computer vision tasks and image processing tasks. The directed acyclic graphs may connect the complex operators into computational pipelines, with conditional execution, finite iteration, and direct memory access (DMA) transfers that execute in parallel as resources are available without intervention by software. The directed acyclic graphs generally provide a flexible way to specify new tasks (or processes), while still providing better efficiency than conventional processors. Additional details for the architecture of the system 100 may be found in co-pending U.S. application Ser. No. 15/459,284, filed Mar. 15, 2017, and 62/500,728, filed May 3, 2017, each of which are hereby incorporated by reference in their entirety.

Figure 2:
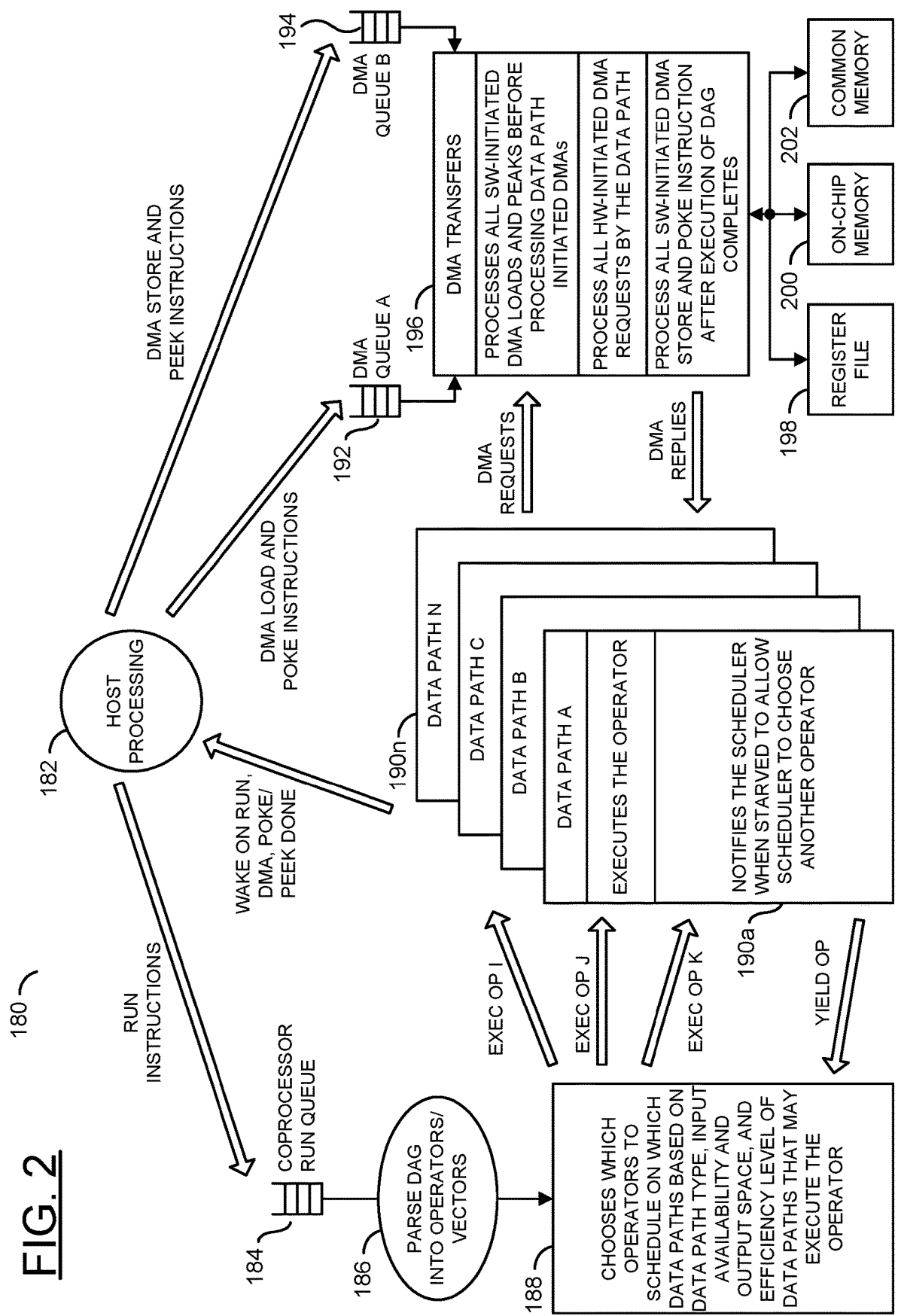
FIG. 2 is a flow diagram of vector processing.

Referring to FIG. 2, a flow diagram of example vector processing 180 is shown. The vector processing 180 generally comprises a step (or state) 182, a step (or state) 184, a step (or state) 186, a step (or state) 188, one or more steps (or states) 190a-190n, a step (or state) 192, a step (or state) 194, a step (or state) 196, a step (or state) 198, a step (or state) 200 and a step (or state) 202. The vector processing 180 may be implemented by the system 100.

The directed acyclic graph vector processing performed by the coprocessor 104 generally supports the general-purpose host processing in the processor 102, where the processor 102 may execute traditional reduced instruction set computing (RISC)-based instructions. Software running on the processor 102 may be the controlling task. Prior to run time, a directed acyclic graph compiler may prepare one or more binary representations of one or more directed acyclic graphs composed of the operators, the location of primary input/output data structures in DRAM circuit 106, and the links between operators through the shared memory 124. The directed acyclic graph binary representations may be loaded into the DAG memory 128.

As the processor 102 executes a coprocessor instruction, the instruction may be placed into a queue of the coprocessor 104. The coprocessor 104 processes the coprocessor instruction from each queue, one at a time. Fetching of input vectors from the DRAM circuit 106 may be specified by separate direct memory access instructions that are not part of the current directed acyclic graph, or may be initiated by the directed acyclic graph. In the latter case, whole input vectors and/or only part of the input vectors may be loaded at any one time. Similarly, stores may be either separate direct memory access instructions or initiated by the directed acyclic graph, in which case whole vectors and/or only part of the vectors may be stored at any one time.

Software running on the processor 102 may command processing of the directed acyclic graph in the coprocessor 104 by executing a "run" coprocessor instruction in the step 182. The "run" coprocessor instruction may be buffered in a coprocessor run queue in the step 184. The "run" instruction generally specifies the address of the directed acyclic graph representation in the DAG memory 128 as an input argument. In some situations, the graphs may be triggered by other means, such as a store to a particular address.

The scheduler circuit 120 may parse the directed acyclic graph into one or more operators and one or more input vectors in the step 186. The scheduler circuit 120 may schedule processing of the operators in the directed acyclic graph in the step 188, and subsequently notify the processor 102 when the directed acyclic graph completes the processing. The scheduler circuit 120 may choose which operators to schedule on which data paths 190a-190n based on the data path types, input availability, output space, and/or efficiency levels of the data paths that may execute the operators. Each data path 190a-190n generally corresponds to a respective hardware engine 122a-122n. Each data path 190a-190n may deal with a single operation at a time. The scheduling may result in execution operations (e.g., EXEC OP I to EXEC OP K) being issued to the data paths 190a-190n. In various situations, multiple operators may be executed in parallel.

In some situations, feedback paths may be appropriate to perform the vector processing tasks. However, directed acyclic graphs generally do not contain any directed cycles and lack any looping control structure. The lack of looping control generally simplifies scheduling, limits internal buffering, and avoids deadlock conditions. Looping control may be performed by the scheduling task 188 that may run a directed acyclic graph multiple times.

In addition to the "run" command, the processor 102 generally supplies other support instructions to allow software executing in the processor 102 some control over the hardware processing. Poke Instructions: The software may make some adjustments to the compiled directed acyclic graph by supplying parameters to guide execution and/or fill in fields that are unknown at directed acyclic graph compilation time. The poke instructions may be buffered in a DMA queue A in the step 192. By way of example, the poke instructions may include the locations of input/output vectors in the DRAM circuit 106 that are unknown during directed acyclic graph compilation.

Peek instructions: The software may specify return values from the directed acyclic graphs after execution completed. The peek instructions may be buffered in a DMA queue B in the step 194. In peek instruction cases, the software may request a transfer in the step 198 from the coprocessor 104 into a general purpose register file in the processor 102. The transfer generally occurs when the coprocessor 104 notifies the controlling task that the directed acyclic graph has completed. The number of registers on the processor 102 may be limited, so only a few results may be returned with each peek instruction. Larger results are generally stored to the DRAM circuit 106.

Wait: A wait instruction may stall the controlling task until all of the instructions for the current directed acyclic graph have completed (including peek instructions and poke instructions). The hardware in the coprocessor 104 generally controls the timing of run, poke/peek, or other vector processor instructions. When the controlling task executes vector processor instructions, the processor 102 may notify the coprocessor 104 that software requests the operations to happen in an ordered way relative to the run instruction (typically pokes before the run command, and peeks afterwards). However, the timing of when the instructions actually execute may be controlled completely by the scheduler circuit 120. Other types of instructions may be implemented to meet the design criteria of a particular application.

The direct memory access transfers may be performed in the step 196 by a direct memory access engine. A highest priority of the direct memory access transfers may be to process all software-initiated direct memory access load instructions and peek instructions before processing direct memory access transfers initiated by the data paths 190a-190n. Next, the direct memory access transfers may process all hardware-initiated request made by the data paths 190a-190n. Finally, the software-initiated direct memory access transfers for store instructions and poke instructions may be executed after the directed acyclic graph tasks are complete. The direct memory access transfers may take place between the intermediate memory (e.g., the DRAM circuit 106 and the shared memory 124) and the host processing (e.g., the processor 102) in the step 182, the register files in the step 198, an on-chip memory (e.g., the shard memory 124) in the step 200 and/or the common memory (e.g., the DRAM circuit 106) in the step 202.

The coprocessor 104 generally contains layers of memory hierarchy with different trade-offs in bandwidth, size, and access latency. The coprocessor 104 may be optimized specifically for access patterns present in the operators. Techniques such as direct chaining, memory chaining, caching, and inter-DAG buffering may be integrated into the DAG execution model without direct intervention from software.

Figure 3:
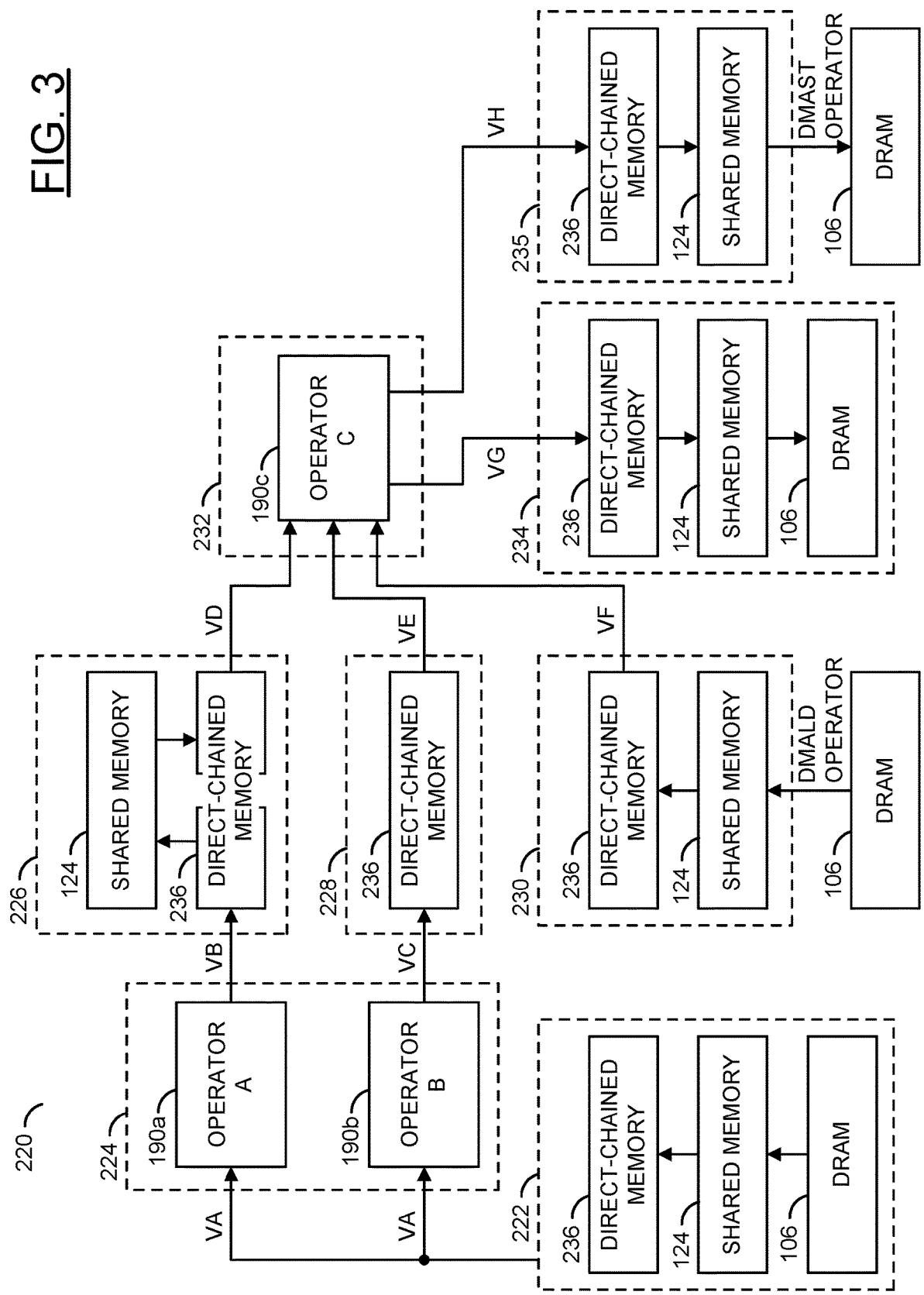
FIG. 3 is a diagram of a vector data flow through the system.

Referring to FIG. 3, a diagram of an example vector data flow 220 is shown. The vector data flow 220 generally comprise a step (or state) 222, a step (or state) 224, a step (or state) 226, a step (or state) 228, a step (or state) 230, a step (or state) 232, a step (or state) 234 and a step (or state) 235. The vector data flow 220 may be implemented in the system 100.

The step 222 may illustrate an example of hardware-managed buffer transfers (e.g., primary input transfers). In the step 222, one or more input vectors may be transferred from the DRAM circuit 106 to a buffer established in the shared memory 124 via the memory bus 108 under control from one or more of the hardware engines 122a-122n. The input vectors may be transferred to a direct-chained memory 236 established in the coprocessor 104 as a companion to the shared memory 124.

The step 224 may illustrate an example of a data path through two of the hardware engines 122a-122n. The input vectors may be presented in parallel in an input signal (e.g., VA) from the direct-chained memory 236 to the circuitry that performs an operator A in a data path (e.g., 190a) and the circuitry that performs another operator B in another data path (e.g., 190b). The operator A may consume the input vectors received in the signal VA and generate one or more output vectors in an output signal (e.g., VB). The operator B may consume the input vectors received in the signal VA and generate one or more output vectors in another output signal (e.g., VC).

If a producing operator sends vector data to a consuming operator and the amount of data specified by the consuming operator is small (typically less than a line of a vector), the two operators may be directly linked to each other using a shared first-in-first-out (FIFO) memory (or buffer). The shared first-in-first-out memory may be dedicated for a specific connection between the data paths 190*a*-190*n* processing the operators, or pooled together in a common first-in-first-out memory and allocated by the compiler software during the directed acyclic graph construction. Each directly-linked connection generally has a highest available bandwidth and smallest memory consumption of any other available on-chip memory structures. An advantage of direct chaining is that operators may not be bandwidth limited when direct chaining is used on the input vectors and the output vectors.

The compiler software may choose the size of memory to use for buffering during the directed acyclic graph compile time or allow the hardware engines 122*a*-122*n* to choose the sizes based on the number of direct-chaining buffers in the directed acyclic graph. If the compiler software chooses, the target hardware configuration (e.g., a specific embodiment of the coprocessor 104) may designate registers for the compiler software to specify the subset of the full vector stored in internal on-chip memory. If the hardware chooses, the size may be determined by taking the entire pool of memory available for direct chaining and partitioning the memory equally among all of the direct chaining buffers. The compiler software may weight the relative sizes of each direct chaining buffer to give some buffers a larger partition.

As the memory buffering between producing operators and consuming operators increases, a next level of on-chip memory may provide more space with the tradeoff of a lower bandwidth. The compiler software may select the exact size of memory to use for buffering during directed acyclic graph compile time. Memory chaining buffers generally contain a subset of the output vectors from an operator, namely the data appropriate for downstream operators to make reasonable forward progress. The compiler software generally specifies a partial dimension and a size of the partial dimension.

When data transfers to/from the DRAM circuit 106 and the operators, the buffering criteria may be treated in a similar way as connections between operators. A portion of the on-chip memory may be dedicated for the consuming operator or the producing operator to buffer, load or store data from/to the DRAM circuit 106 based on processing rates of the operator, and transfer sizes suitable to optimize efficiency to/from the DRAM circuit 106. As with chaining buffers, a subset of the vector data is generally contained in the buffer at any given time.

The step 226 generally illustrates an example of a memory chaining transfer. The output vectors in the signal VB may be received by the direct-chained memory 236. The output vectors may be presented from the direct-chained memory 236 to a buffer established in the shared memory 124. The vector data buffered in the shared memory 124 may later be transferred to the direct-chained memory 236 and subsequently be presented as input vectors in a signal (e.g., VD) to another data path (e.g., 190*c*).

The step 228 may illustrate an example of a direct-chaining buffer transfer. The output vectors in the signal VC may be received by the direct-chained memory 236 where the output vectors are temporarily stored. The vector data buffered in the direct-chained memory 236 may subsequently be transferred as input vectors in a signal (e.g., VE) to the other data path (e.g., 190*c*).

The step 230 generally illustrates an example of a software-managed buffer transfer. One or more additional input vectors may be transferred from the DRAM circuit 106 to the shared memory 124 based on a DMA load (DMALD) operator. The transfer may be requested by the software executing in the processor 102. From the shared memory 124, the input vectors may be provided to the direct-chained memory 236 for temporary storage. The input vectors may later be presented in a signal (e.g., VF) to the other data path (e.g., 190*c*).

Software-managed buffers generally allow the software executing in the processor 102 to DMA data into the on-chip memory, especially if the vector is small. Using appropriate DMA instructions, the controller task in the processor 102 may preload input vectors from the DRAM circuit 106 into the shared memory 124 or store the output vectors from the shared memory 124 to the DRAM circuit 106 after a directed acyclic graph program completes. The DMA operators may work on the entire vectors, thus any software-managed buffer may completely fit into the on-chip memory (e.g., no streaming or partial buffering). Such buffers may be called "software-managed" because the communication is managed via how the controlling task (software) in the processor 102 sequences the execution of the directed acyclic graphs and the DMA operations in the task.

The coprocessor 104 is generally managed by the controlling task running in the processor 102. The programmable processor 102 generally implements higher level looping constructions that may not be expressed as vector operations in the directed acyclic graphs (e.g., loops that violate the "acyclic" part of the directed acyclic graphs). Where the software manages processes that utilize feedback, or more processing steps than may fit in a single directed acyclic graph, the software may use multiple directed acyclic graphs to build up a full-fledge task. The multiple directed acyclic graphs may be managed by the controlling task in the processor 102. While data sharing may not rely on software-managed buffers, the software-managed buffering generally allow different directed acyclic graphs to share information using the on-chip memory exclusively. The controlling task may always share data between directed acyclic graphs through buffers created in the DRAM circuit 106.

The coprocessor 104 generally provides one or more circular buffers of vectors. Each bank in a circular buffer may be associated with a single vector for software-managed buffer cases. Each bank may be held in the internal on-chip memory and sized to the original vector dimensions. The hardware in the controller 134 generally manages read pointers and write pointers (a read pointer and a write pointer for each circular buffer) to track available vectors in the circular buffers. The scheduler 120, the operator readiness circuit 130 and the DMA engine 196 may also be involved with pointer management. The software in the processor 102 may not modify the bank read/write pointers during the directed acyclic graph processing. The coprocessor 104 may update the software-visible banking pointers at the end of the directed acyclic graph processing. The directed acyclic graphs that load data from the circular buffers may advance the corresponding read pointers. The directed acyclic graphs that store data from the banked vectors may advance the corresponding writer pointers. The number of banks may be determined at directed acyclic graph compile time, and the processor 102 is generally responsible for scheduling the producing directed acyclic graphs and the consuming directed acyclic graphs to avoid overflowing the number of banks in the circular buffers.

The read/write pointer management generally depends on a current case. In a DRAM-to-Operator case, the DMA engine 196 may advance the write pointers via hardware-generated POKE instructions when the DMALD operations complete and the DMA engine 196 notifies the scheduler 120 that dependent operators now have all available data. Similarly the schedule 120 may advance the read pointers after every consuming operator completes processing all data in the corresponding bank. The advance generally involves going through the DMA engine 196 to update the contents of shared memory 124 via another hardware-generated POKE instruction.

In an Operator-to-DRAM case, the write pointers may advance when the producing operators complete (and produced the entire vectors). The scheduler 120 may generate hardware-generated POKE instructions to DMA engine 196 to modify the writer pointers. The DMA engine 196 generally advances the read pointers (via a hardware POKE instruction) when a DMAST operation to transfer data from the shared memory 124 to the DRAM circuit 106. The DMA engine 196 may subsequently notify the scheduler 120 that the read bank advanced. An internal view of the read/write pointers may be held in the controller 134 and be more accurate than the contents of the shared memory 124 while the directed acyclic graph is being processed in the coprocessor 104 due to time delays for the hardware-generated POKE instructions to complete.

The read bank pointers and write bank pointers may be optionally exposed to the processor 102 via the peek commands. The location(s) of the bank pointers in the on-chip memory generally depend on the layout of the directed acyclic graphs, and two different directed acyclic graphs may not place the bank pointers in the same memory location. If a circular buffer is shared between two different directed acyclic graphs, the controlling task in the processor 102 may copy the bank points between the directed acyclic graphs using the poke commands.

The producer/consumer of a software-managed buffer may be the controlling task in the processor 102. The processor 102 may preload data into the banked buffers using the DMA load instruction that copies data from the DRAM circuit 106 into the banks. When the DMA load instruction completes, the coprocessor 104 may advance the read bank pointers. Similarly, the DMA store instruction issued by the processor 102 may copy data from the banks into the DRAM circuit 106 and the coprocessor 104 advances the write bank pointers. The DMA load instructions and the DMA store instructions may be coprocessor support instructions and ordered with peek/poke/run instructions. The processor 102 generally requests that each operation is made, but the hardware in the coprocessor 104 may be responsible for determining the best time to initiate the transfers.

The step 232 may illustrate an example of another data path through at least one of the hardware engines 122a-122n. The input vectors in the signals VD, VE and VF may be received by an operator C in a data path (e.g., 190c). The operator C may consume the input vectors and generate one or more output vectors in a signal (e.g., VG). The signal VG may transfer the output vectors to the direct-chained memory 236 within the block 234. The operator C may also generate one or more output vectors in a signal (e.g., VH). The signal VH may transfer the output vectors to the direct-chained memory 236 within the block 235.

The step 234 may illustrate an example of another hardware-managed buffer transfer (e.g., primary output transfer). The output vectors conveyed in the signal VG may be buffered in the direct-chained memory 236. From the direct-chained memory 236, the output vectors may be transferred to a buffer in the shared memory 124. The output vectors may subsequently be transferred via the memory bus 108 to an additional memory (e.g., the DRAM circuit 106). Control of the transfers into the direct-chained memory 236, into the shared memory 124 and into the DRAM memory 106 may be provided by the hardware engine 122a-122n that processed the operator C.

The step 235 generally illustrates an example of another software-managed buffer transfer (e.g., primary output transfer). The output vectors conveyed in the signal VH may be buffered in the direct-chained memory 236. From the direct-chained memory 236, the output vectors may be transferred to a buffer in the shared memory 124. From the shared memory 124, the output vectors may be transferred via the memory bus 108 to the additional memory (e.g., the DRAM circuit 106) based on a DMA store (DMAST) operator. The transfer to the DRAM circuit 106 may be requested by the software executing in the processor 102.

Figure 4:
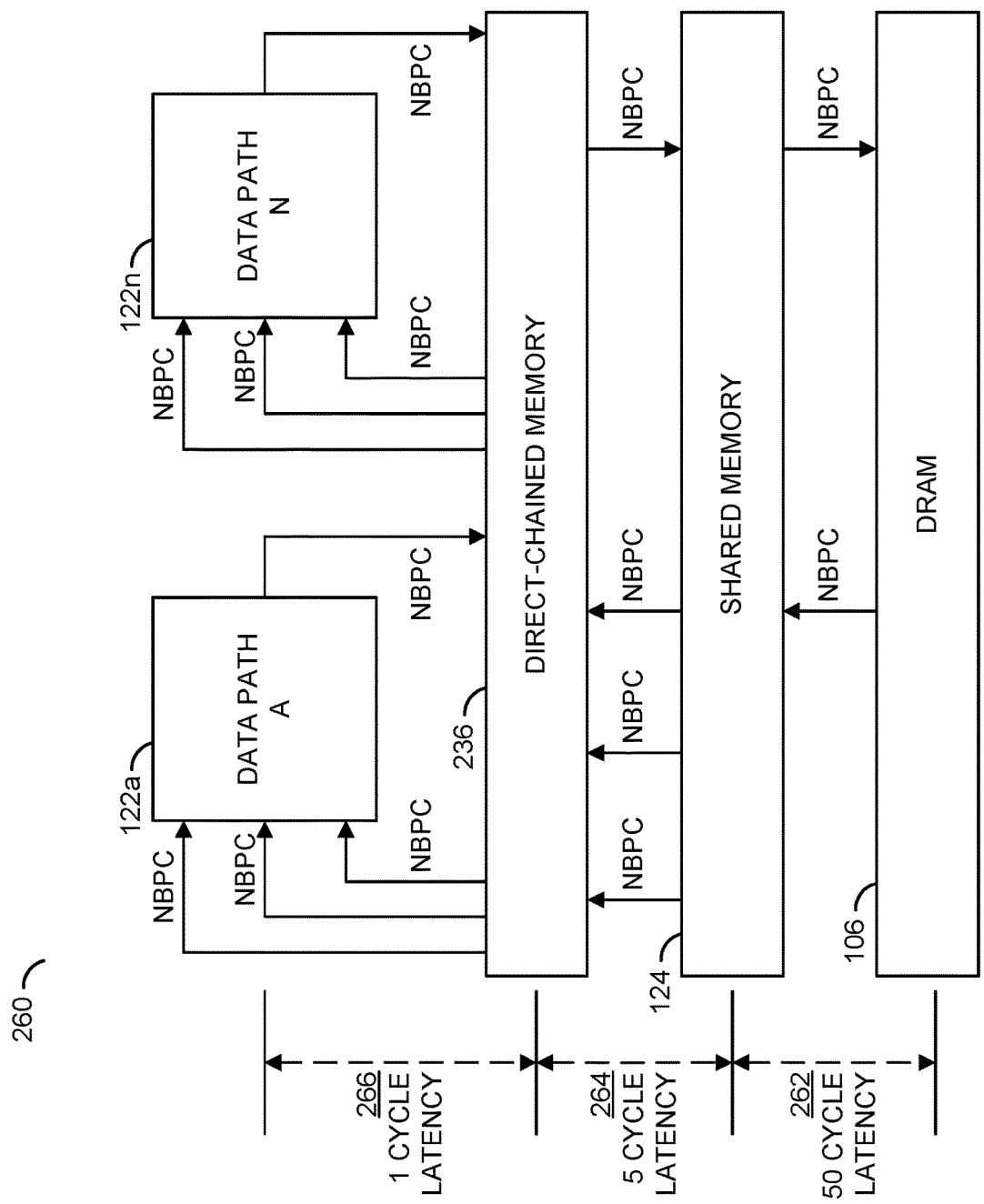
FIG. 4 is a diagram of a memory hierarchy.

Referring to FIG. 4, a diagram of an example memory hierarchy 260 is shown. The memory hierarchy 260 generally comprises the DRAM circuit 106, the shared memory 124, the direct-chained memory 236 and the hardware engines 122a-122n. The memory hierarchy 260 may be implemented in the system 100.

The input vectors may initially be stored in the DRAM circuit 106. The DRAM circuit 106 may transfer the input vectors across the memory bus 108 at a rate of N-bits per cycle (NBPC). In various embodiments, the N-bits per cycle may be 32-bits or 64-bits per cycle. Other rates may be implemented to meet the design criteria of a particular application. A latency 262 of the transfers from the DRAM circuit 106 to the shared memory 124 may be approximately dozens of clock cycle latencies (e.g., 40 to 60 clock cycles).

From the shared memory 124, the input vectors may be transferred to the direct-chained memory 236. The transfers may be performed in series and/or in parallel. Each transfer may be accomplished at the N-bits per cycle rate. A latency 264 of the transfers from the shared memory 124 to the direct-chained memory 236 may be shorter than the latency 262 from the DRAM circuit 106 to the shared memory 124. In various embodiments, the latency 264 of the input vector transfers from the shared memory 124 to the direct-chained memory 236 may be approximately 4 clock cycles to 6 clock cycles.

The input vectors may be transferred from the direct-chained memory 236 to the hardware engines 122a-122n. The transfers may be performed in series and/or in parallel. Each transfer may be accomplished at the N-bits per cycle rate. A latency 266 of the transfers from the direct-chained memory 236 to the hardware engines 122a-122n may be shorter than the latency 264 from the shared memory 124 to the direct-chained memory 236. In various embodiments, the latency 266 of the input vector transfers from the direct-chained memory 236 to the hardware engines 122a-122n may be approximately a single clock cycle.

The output vectors generated by the data paths implemented within the hardware engines 122a-122n may be relayed down through the memory hierarchy 260 back to the DRAM circuit 106.

The output vectors from the hardware engines 122a-122n may be transferred to the direct-chained memory 236 at the N-bits per cycle rate. The transfer may be performed at the single clock cycle latency 266.

From the direct-chained memory 236, the output vectors may be transferred to the shared memory 124. The transfers may be performed at the N-bits per cycle rate. The latency 264 of the transfers may be the approximately 4 clock cycles to 6 clock cycles. From the shared memory 124, the output vectors may be transferred via the memory bus 108 to the DRAM circuit 106. The transfers may be performed at the N-bits per cycle rate. The latency 262 of the transfers may be the approximately 40 clock cycles to 60 clock cycles.

Figure 5:
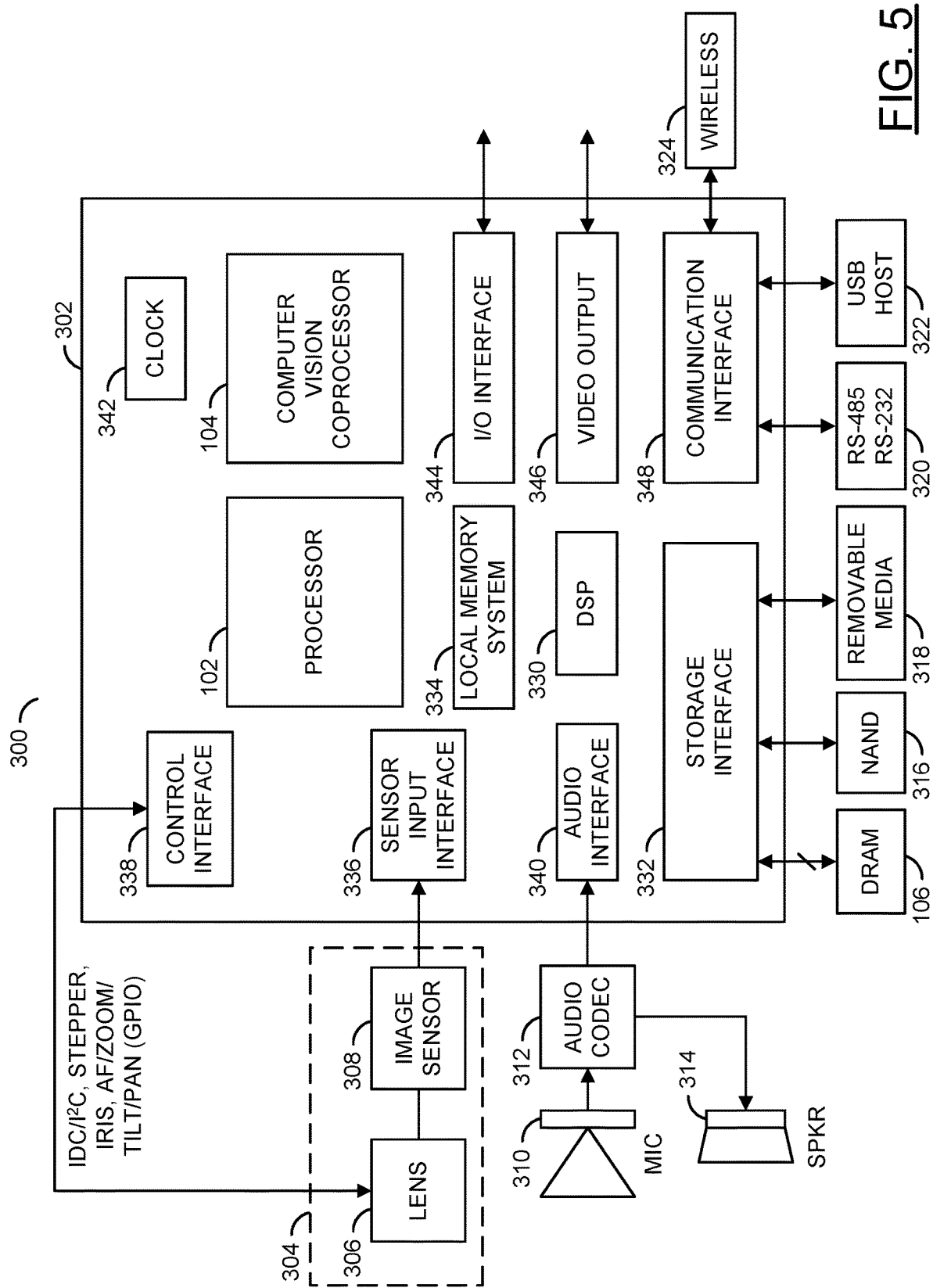
FIG. 5 is a diagram of a camera system.

Referring to FIG. 5, a diagram of a camera system 300 is shown illustrating an example implementation of a vector processing system in accordance with an embodiment of the present invention. In one example, the electronics of the camera system 300 may be implemented as one or more integrated circuits. For example, an application specific integrated circuit (ASIC) or system on chip (SOC) may be used to implement the camera system 300.

In one example, the camera system 300 may comprise the DRAM circuit 106, a processor/camera chip (or circuit) 302, a block (or assembly) 304 having a block 306 and one or more blocks (or circuits) 308, a block (or circuit) 310, a block (or circuit) 312, a block (or circuit) 314, a block (or circuit) 316, a block (or circuit) 318, a block (or circuit) 320, a block (or circuit) 322 and a block (or circuit) 324. The circuits 106 and 304-324 may be connectable to the camera circuit 302.

In various embodiments, the camera circuit 302 may comprise one or more processors 102 (e.g., ARM, etc.), one or more coprocessors 104, a block (or circuit) 330, a block (or circuit) 332, a block (or circuit) 334, a block (or circuit) 336, a block (or circuit) 338, a block (or circuit) 340, a block (or circuit) 342, a block (or circuit) 344, a block (or circuit) 346 and a block (or circuit) 348. The circuits 102 through 348 may be connected to each other using one or more buses, traces, protocols, etc.

The circuit 304 may implement a lens and sensor assembly. The lens and sensor assembly 304 is shown connected to the camera circuit 302. In some embodiments, the lens and sensor assembly 304 may be a component of the camera circuit 302 (e.g., a SoC component). In some embodiments, the lens and sensor assembly 304 may be a separate component from the camera circuit 302 (e.g., the lens and sensor assembly may be an interchangeable component compatible with the camera circuit 302). In some embodiments, the lens and sensor assembly 304 may be part of a separate camera connected to the processing portion of the circuit 302 (e.g., via a video cable, a high definition media interface (HDMI) cable, a universal serial bus (USB) cable, an Ethernet cable, or wireless link). The lens and sensor assembly 304 may comprise other components (not shown). The number, type and/or function of the components of the lens and sensor assembly 304 may be varied according to the design criteria of a particular application.

The block 306 may implement a lens 306. The lens 306 may capture and/or focus light input received from the environment near the camera 300. The lens 306 may capture and/or focus light for the circuit 308. The lens 306 may be implemented as an optical lens. The lens 306 may provide a zooming feature and/or a focusing feature. The lens and sensor assembly 304 may be implemented with additional circuitry (e.g., motors) to adjust a direction, zoom and/or aperture of the lens 306. The lens 306 may be directed, tilted, panned, zoomed and/or rotated to provide a targeted view of the environment near the camera 300.

The circuit 308 may implement an image sensor. The image sensor 308 may receive light from the lens 306. The image sensor 308 may be configured to transform the received focused light into digital data (e.g., bitstreams). In some embodiments, the image sensor 308 may perform an analog to digital conversion. For example, the image sensor 308 may perform a photoelectric conversion of the focused light received from the lens 306. The image sensor 308 may present the converted image data as a color filter array (CFA) formatted bitstream. The camera circuit 302 may transform the bitstream into video data, video files and/or video frames (e.g., human-legible content).

The circuit 310 may be a microphone for capturing audio. The circuit 312 may be an audio codec for recording audio in a particular format. The circuit 314 may be a speaker for playing audio.

The circuit 316 may implement a nonvolatile memory (e.g., NAND flash memory, NOR flash memory, etc.). The circuit 318 may implement a removable media 318 (e.g., secure digital media (SD), secure digital extended capacity media (SDXC), etc.). The circuit 320 may implement one or more serial communication channels 320 (e.g., RS-485, RS-232, etc.). The circuit 322 may implement one or more universal serial bus (USB) hosts 322 and/or USB interfaces. The circuit 324 may implement wireless interface for communicating with a user device (e.g., a smart phone, a computer, a tablet computing device, cloud resources, etc.). In various embodiments, the wireless interface 324 and/or the USB Host 322 may be configured for communicating with a camera controller wirelessly. In the embodiment shown, the circuits 304-324 are implemented as components external to the camera circuit 302. In some embodiments, the circuits 304-324 may be components on-board the camera circuit 302.

The circuit 330 may be a digital signal processing (DSP) module. In some embodiments, the circuit 330 may implement separate image DSP and video DSP modules. The DSP module 330 may be configured to process digital signals. The DSP module 330 may comprise an image digital signal processor (IDSP), a video digital signal processor DSP (VDSP) and/or an audio digital signal processor (ADSP). The DSP module 330 may be configured to receive information (e.g., pixel data values captured by the image sensor 308) from the circuit 336. The DSP module 330 may be configured to determine the pixel values (e.g., RGB, YUV, luminance, chrominance, etc.) from the information received from the sensor input 336. The DSP module 330 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The circuit 332 may be a storage interface. The storage interface 332 may be configured to manage one or more types of storage and/or data access. In one example, the storage interface 332 may implement a direct memory access (DMA) engine and/or a graphics direct memory access (GDMA). In another example, the storage interface 332 may implement a secure digital (SD) card interface (e.g., to connect to the removable media 318). The circuit 334 may implement a local memory system (e.g., cache, fast random access memory, etc.). In various embodiments, programming code (e.g., executable instructions for controlling various processors and encoders of the camera circuit 302) may be stored in one or more of the memories (e.g., the DRAM circuit 106, the NAND 316, etc.). When executed by the processors 102, the programming code generally causes one or more components in the camera circuit 302 to configure video synchronization operations and start video frame processing operations. The resulting compressed video signal may be presented to the storage interface 332, the video output 346 and/or the communication module 348. The storage interface 332 may transfer program code and/or data between external media (e.g., the DRAM circuit 106, the NAND 316, the removable media 318, etc.) and the local (internal) memory system 334.

The circuit 336 may implement a sensor input (or interface). The sensor input 336 may be configured to send/receive data to/from the image sensor 308. In one example, the sensor input 336 may comprise an image sensor input interface. The sensor input 336 may be configured to transmit captured images (e.g., light data) from the image sensor 308 to the DSP module 330 and/or the processors 102. The data received by the sensor input 336 may be used by the DSP 330 to determine a luminance (Y) and chrominance (U and V) values from the image sensor 308. The sensor input 336 may provide an interface to the lens and sensor assembly 304. The sensor input 336 may enable the camera circuit 302 to capture image data from the lens and sensor assembly 304.

The circuit 338 may implement one or more control interfaces including but not limited to an inter device communication (IDC) interface, an inter integrated circuit ($I^2C$) interface, a serial peripheral interface (SPI), and a pulse width modulation (PWM) interface. The control interface 338 may be configured to generate signals (e.g., IDC/I2C, STEPPER, IRIS, AF/ZOOM/TILT/PAN, etc.) for controlling the lens and sensor assembly 304. The signal IRIS may be configured to adjust an iris for the lens and sensor assembly 304. The control interface 338 may enable the camera circuit 302 to control the lens and sensor assembly 304.

The circuit 340 may implement an audio interface (e.g., an $I^2S$ interface, etc.). The audio interface 340 may be configured to send/receive audio data. In one example, the audio interface 340 may implement an audio inter-IC sound ($I^2S$) interface. The audio interface 340 may be configured to send/receive data in a format implemented by the audio codec 312. The circuit 342 may implement a clock circuit including but not limited to a real time clock (RTC), a watchdog timer (WDT), and/or one or more programmable timers.

The circuit 344 may implement an input/output (I/O) interface. The I/O interface 344 may be configured to send/receive data. The data sent/received by the I/O interface 344 may be miscellaneous information and/or control data. In one example, the I/O interface 344 may implement a general purpose input/output (GPIO) interface. In another example, the I/O interface 344 may implement an analog-to-digital converter (ADC) module and/or digital-to-analog converter (DAC) module. In yet another example, the I/O interface 344 may implement an infrared (IR) remote interface. In still another example, the I/O interface 344 may implement one or more synchronous data communications interfaces (IDC SPI/SSI).

The circuit 346 may be a video output module. The video output module 346 may be configured to send video data. For example, the camera 300 may be connected to an external device (e.g., a TV, a monitor, a laptop computer, a tablet computing device, etc.). The video output module 346 may implement a high-definition multimedia interface (HDMI), an LCD/TV/Parallel interface and/or a DisplayPort interface. The video data may be presented in one or more formats (e.g., PAL, NTSC, VGA, WVGA, QVGA, SD, HD, Ultra HD, 4K, etc.).

The circuit 348 may be a communication module. The communication module 348 may be configured to send/receive data. The data sent/received by the communication module 348 may be formatted according to a particular protocol (e.g., Bluetooth, USB, Wi-Fi, UART, etc.). In one example, the communication module 348 may implement a secure digital input output (SDIO) interface. The communication module 348 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX and/or SMS. The communication module 348 may also include support for communicating using one or more of the universal serial bus protocols (e.g., USB 1.0, 2.0, 3.0, etc.). The camera circuit 302 may also be configured to be powered via a USB connection. However, other communication and/or power interfaces may be implemented accordingly to meet the design criteria of a particular application.

The functions performed by the diagrams of FIGS. 1-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines, virtual machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
 a plurality of hardware engines configured to generate a plurality of output vectors by processing zero or more input vectors using a plurality of operators;
 a scheduler circuit configured to (i) store a directed acyclic graph, (ii) parse said directed acyclic graph into said plurality of operators and (iii) schedule said plurality of operators in one or more of said hardware engines based on when said plurality of operators are ready to be processed by said plurality of hardware engines; and
 a shared memory configured to transfer at least one of said plurality of output vectors generated by a first of said plurality of operators to a second of said plurality of operators, wherein said shared memory is (i) accessible to all of said plurality of hardware engines and (ii) configured to buffer a subset and not all of said plurality of output vectors at any given time.

2. The apparatus according to claim 1, further comprising a processor in communication with said scheduler circuit, wherein said scheduler circuit and said plurality of hardware engines are configured to support one or more programs executing in said processor.

3. The apparatus according to claim 1, further comprising a first-in-first-out memory configured to transfer at least one of said plurality of output vectors directly to another of said plurality of operators.

4. The apparatus according to claim 1, wherein said plurality of hardware engines are configured as one or more data paths for said plurality of operators.

5. The apparatus according to claim 4, wherein one or more of said data paths is implemented solely in hardware.

6. The apparatus according to claim 1, further comprising a processor configured to allocate a portion of said shared memory to buffer said plurality of output vectors.

7. The apparatus according to claim 1, further comprising a direct memory access engine configured to transfer vector data in both directions between an additional memory and said shared memory.

8. The apparatus according to claim 1, further comprising a first-in-first-out memory configured to directly transfer vector data to one of said plurality of operators, wherein said plurality of hardware engines are further configured to transfer said vector data between said shared memory and said first-in-first-out memory.

9. The apparatus according to claim 1, further comprising a processor configured to control looping around said directed acyclic graph.

10. The apparatus according to claim 1, wherein (i) the shared memory is (a) accessible by said plurality of hardware engines and (b) configured as one or more circular buffers, (ii) each of said one or more circular buffers has a plurality of banks and (iii) each of said plurality of banks is allocated a size to enable storage of at least one of said plurality of output vectors.

11. The apparatus according to claim 10, wherein said scheduler circuit is further configured to determine a location of each of said one or more circular buffers in said shared memory based on said directed acyclic graph.

12. The apparatus according to claim 10, wherein said plurality of hardware engines are further configured to manage a read pointer and a write pointer for each of said one or more circular buffers.

13. The apparatus according to claim 10, further comprising a processor configured to manage said one or more circular buffers to avoid overflowing said plurality of banks.

14. The apparatus according to claim 1, wherein said directed acyclic graph defines a computer vision process.

15. The apparatus according to claim 1, wherein said scheduler circuit is implemented solely in hardware.

16. The apparatus according to claim 1, wherein said scheduler circuit further comprises an operator readiness circuit configured to determine when said plurality of operators are ready to be processed by said plurality of hardware engines.

17. A method for vector processing, comprising steps of:
 storing a directed acyclic graph in a scheduler circuit;
 parsing said directed acyclic graph into a plurality of operators;
 scheduling said plurality of operators in one or more of a plurality of hardware engines based on when said plurality of operators are ready to be processed by said plurality of hardware engines;
 generating a plurality of output vectors by processing zero or more input vectors in said plurality of hardware engines using said plurality of operators; and
 transferring at least one of said plurality of output vectors generated by a first of said plurality of operators through a shared memory to a second of said plurality of operators, wherein said shared memory is (i) accessible to all of said plurality of hardware engines and (ii) configured to buffer a subset and not all of said plurality of output vectors at any given time.

18. The method according to claim 17, further comprising a step of:

transferring at least one of said plurality of output vectors through a first-in-first-out memory directly to another of said plurality of operators.

19. The method according to claim 17, further comprising a step of:

transferring vector data between an additional memory and said shared memory using a direct memory access engine.

20. The method according to claim 17, wherein at least one of said plurality of hardware engines is implemented solely in hardware.

* * * * *